(12) United States Patent
Graham

(10) Patent No.: US 8,275,754 B1
(45) Date of Patent: Sep. 25, 2012

(54) METHOD AND APPARATUS FOR STATE TRACKING OF DATA FROM MULTIPLE OBSERVERS

(75) Inventor: James A. Graham, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 444 days.

(21) Appl. No.: 12/034,624

(22) Filed: Feb. 20, 2008

Related U.S. Application Data

(60) Provisional application No. 61/022,744, filed on Jan. 22, 2008.

(51) Int. Cl.
*G06F 7/00* (2006.01)
*G06F 17/00* (2006.01)
(52) U.S. Cl. .................... 707/687; 707/690; 707/694
(58) Field of Classification Search ........... 707/999.005, 707/687, 690, 694
See application file for complete search history.

(56) References Cited

U.S. PATENT DOCUMENTS

| | | | | |
|---|---|---|---|---|
| 6,128,655 | A * | 10/2000 | Fields et al. | 709/219 |
| 7,836,433 | B2 * | 11/2010 | Fanning et al. | 717/126 |
| 2008/0140660 | A1 * | 6/2008 | Masuda et al. | 707/6 |
| 2008/0222212 | A1 * | 9/2008 | Prasad et al. | 707/201 |
| 2009/0157740 | A1 * | 6/2009 | Barley et al. | 707/103 R |

OTHER PUBLICATIONS

U.S. Appl. No. 61/007,633, filed Dec. 14, 2007.*

* cited by examiner

*Primary Examiner* — Jay Morrison
(74) *Attorney, Agent, or Firm* — Polsinelli Shughart PC

(57) ABSTRACT

One particular implementation conforming to aspects of the present invention takes the form of a method for tracking the stability of a data set for multiple observers. More particularly, a tracker object may be used to both mark a particular state of the data and to query if the data remains unchanged. Code that accesses the data set to calculate a result may fetch a reference to a current tracker object associated with the data set. The code may compare the current tracker object received from the data set against the tracker object associated with the last cached result. In an alternate arrangement, a state may be associated with the data set to indicate some characteristics of the data set. The state value associated with the data set may further simplify the action required by a code accessing the data set to receive an accurate calculation.

20 Claims, 3 Drawing Sheets

METHOD AND APPARATUS FOR STATE TRACKING OF DATA FROM MULTIPLE OBSERVERS

CROSS-REFERENCE TO RELATED APPLICATIONS

This application claims priority to U.S. Provisional No. 61/022,744 entitled "STATE TRACKING OF COMPLEX DATA FROM MULTIPLE OBSERVERS," naming James A. Graham as inventor and filed on Jan. 22, 2008, the entirety of which is hereby incorporated by reference.

FIELD OF THE INVENTION

Aspects of the present invention relate to data management. More particularly, aspects of the present invention involve a method and apparatus for tracking modifications to a data set for multiple observers.

BACKGROUND

Many computer-based computations involve the processing of very large data sets. Frequently, however, the conclusion to be drawn by the computations, while computationally intensive due to the nature of the calculations and/or the size of the data set, nonetheless yields a simple or straightforward result. For example, in image processing, a code may need to determine whether an image contains a particular shade or shades of gray. Depending on the size of the image and the arrangement of the image data, identifying a particular shade of gray may require millions of computations, but the end result is simply identifying whether the image has a particular shade of gray.

In many cases, such results are needed multiple times. If the data set remains constant, this does not present a problem. Instead of running the calculation algorithm every time the result is needed, programs often compute the answer once and cache that answer for future reference. However, if the data set is ever modified, a cached result may be based on an old version of the data set. Returning to the previous example, suppose a program alters the image after a code has identified whether the image contains a particular shade of gray. Rather than rely on the previously cached result, the code should be made aware that the image was altered so that it may recalculate whether the image contains a particular shade of gray. Therefore, programs containing a data set should ensure that a code accessing the data set should recalculate any cached results if the data set is ever modified.

Notifying a program that the data set has been modified is relatively simple when only one program has access to the data set. But when multiple objects or observers have access to the data set, all with separate cached answers, tracking all of the modifications and observers can be difficult. Thus, what is needed is a mechanism to ensure that cached calculation results of multiple observers of the data set are recalculated if the data set is ever modified, amongst other things.

SUMMARY

One aspect of the present invention involves a method for tracking the stability of a data set for multiple observers. The method provides access to a data set by a code. The method also determines whether the data set is modified by the code. If the data set is modified, the method sets a current data set tracker to a first value. If the data set is not modified, the method compares a stored data set tracker to the current data set tracker and uses a cached result if the stored data set tracker and the current data set tracker are the same.

Another aspect of the present invention involves a method for accessing a data set. The method compares a stored data set tracker with a current data set tracker. If the stored data set tracker and the current data set tracker are the same, the method uses a cached result. If the trackers are not the same, the method then determines if the current data set tracker is set to a first value. If the current data set tracker is set to the first value, the method creates a new data set tracker, calculates a result based on the data set and caches the result and the new data set tracker. If the current data set tracker is not set to the first value, the method calculates a result based on the data set and caches the result and a reference to the current data set tracker.

A further aspect of the present invention involves a system for tracking the stability of a data set for multiple observers. The system includes a system interface and a processor coupled to the system interface through a processor bus. The processor is configured to determine whether a current data set tracker is set to a first value. If the data set tracker is set to the first value, the processor creates a new data set tracker, calculates a result based on the data set and caches the result and the new data set tracker. If the data set tracker is not set to the first value, the processor compares a cached data set tracker to the current data set tracker and, if the cached data set tracker ad the current data set tracker are different, calculates a result based on the data set and caches the result and the current data set tracker.

DETAILED DESCRIPTION

Figure 1:
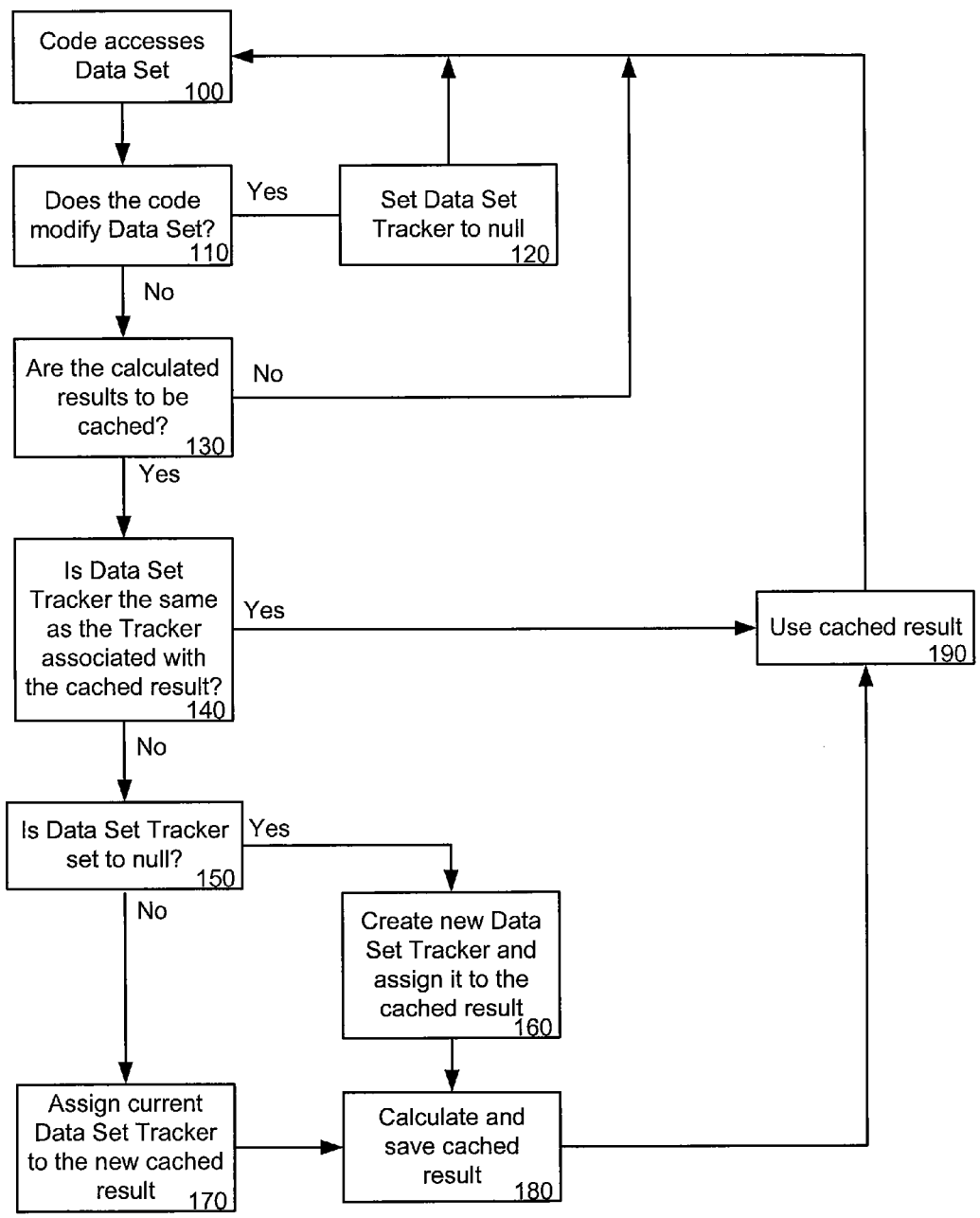
FIG. 1 is a flow chart illustrating one embodiment of the present invention providing a tracker for a data set.

One particular implementation conforming to aspects of the present invention takes the form of a computer implemented method for tracking the stability of a data set for multiple observers. The implementation may simplify the operations required by any code modifying the data set and may decrease the chances of an incorrect assessment of the state of the data set.

More particularly, a tracker object may be used to both mark a particular state of the data and to query if the data remains unchanged. Any code that modifies the data set may set the reference to the current tracker associated with the data set to a value that represents that the data set has been modified. For example, the code may set the reference to the current tracker associated with the data set to null after modification. Code that accesses the data set to calculate a result, rather than to modify the data set, may fetch a reference to the current tracker associated with the data set or instruct the data set to create a new tracker object if the current tracker associated with the data set is null. As multiple codes modify and access the data set, multiple tracker objects may be created by the data set to mark the various modifications. Further, as multiple codes access the data set without modifying it, an existing tracker object associated with the data set may be shared and recorded in association with multiple cached results to indicate that they may be valid with respect to the same version of the data set. A code accessing the data set may then compare the current tracker associated with the data set against a tracker associated with a previous cached result. If the current tracker associated with the data set and the tracker associated with the previous cached result are different, the code accessing the data set may need to recalculate the result because the data set may have been changed. If the current tracker associated with the data set and the tracker associated with the previous cached result are the same, the code may bypass the calculation and use the previously cached result, as the data set has likely not been modified since the last result was calculated.

In an alternate arrangement, a state may be associated with the data set to indicate some characteristics of the data set. Associating a state with the data set may further simplify the action required by a code accessing the data set to receive an accurate calculation. For example, an immutable state may be associated with the data set signifying that the data set will likely remain unchanged. Thus, code accessing a data set that has an immutable state may never need to recalculate the cached result. In another example, an untrackable state may be associated with the data set indicating that the changes made to the data set cannot be tracked. In this example, code accessing the data set may need to recalculate the result. In one particular embodiment, a code accessing an untrackable data set to calculate a result may choose to calculate a faster, but less accurate answer. The code may then use the state of the data set to determine when and how the recalculation should be made without needing to access a tracker object. Such state designation may be employed alone or in conjunction with other state designations and may also be employed in conjunction with tracker objects.

FIG. 1 is a flow chart illustrating one particular method conforming to aspects of the present invention. In operation 100, a code may access a complex data set. A code may access a complex data set for many reasons, including to modify the data set or to use the data contained in the data set to perform some sort of calculation. In operation 110, it is determined whether the code modifies the data set or uses the data set to calculate a result. In this embodiment, if the code modifies the data set, the code may then set the reference to a data set tracker object to null in operation 120. Other embodiments may set the reference to the data set to any value. In the embodiment depicted in FIG. 1, setting the reference to the data set tracker object to null indicates to other code that may subsequently access the data set for calculation that the data set has been modified.

The reference may be set to null at one or more times during the modification, including before or after any of the data is modified. In one embodiment, the references are set to null after the data was modified in order to best avoid a race condition with another set of code which may create a new tracker reference while the data set is being modified. In another embodiment, the code may also continuously set the reference to the tracker to null throughout the modification process, including a final setting to null after the modification is complete.

Setting the reference to the data set tracker object to a value that represents that the data set has been modified instead of immediately creating a new tracker object may provide many advantages to a program that contains a data set. One advantage is that the reference to the tracker object may remain set at the value through countless modifications to the data set. Some complex data sets are modified significantly more often than they are accessed by code to perform calculations. Therefore, rather than creating a new tracker object every time the data set is modified, the reference to the current tracker object may remain at the value until a code accesses the data to perform a calculation, at which time a new tracker object is created. By reducing the number of times a new tracker object is created, the required operations to be performed by the program is reduced.

The following is one example of pseudo-code for operation 110 and operation 120:

```
DataSet {
    Reference Tracker;
    function modify( . . . ) {
    //modify some elements of the data set
    Call DataSet.nullTracker ( );
    }
    function nullTracker( ){
    Set <DataSet.Tracker>reference to the null reference;
    }
}
```

If it is determined in operation 110 that the code will not modify the data set but rather accesses the data set to calculate a result, it is then determined whether the calculated result is to be cached in operation 130. If the calculated result is not to be cached, then the code may simply calculate the result using the data of the data set. This may occur when a code needs to only access the data set once to get a result. However, as described above, if a code accesses the data set multiple times, it may be beneficial to cache a calculated result for future use rather than perform the calculation each time the data set is accessed.

If it is determined in operation 130 that the calculated results will be cached, the code may then compare the data set tracker object associated with an earlier cached result to the current data set tracker object in operation 140. For example, if code A accesses the data set to compute a calculation, a reference to the data set tracker object may be assigned to that cached result. If code A again accesses the data set at a later time, the data set tracker object associated with the cached result may be compared to the current data set tracker object. If the tracker object associated with the cached result and the current data set tracker object are different, then the data set was modified since the last calculation by code A. Therefore, code A may ensure that the calculation is performed again on the modified data set rather than rely on the cached result from a previous data set.

As explained in more detail below, to avoid a situation where the current data set tracker reference and the tracker associated with the cached result are both null when compared in operation 140, the initial state of the reference tracker associated with the cached result may be initialized to point to a special tracker instance which may indicate that the data has been changed. Otherwise, the embodiment in FIG. 1 may have to account for the possibility of the current data set tracker reference and the tracker associated with the cached result both being null by providing for an additional operation that determines whether the cached result tracker is null. Other embodiments may set the data set tracker reference to a value that indicates that the data set has been modified to avoid the situation where of the reference tracker associated with the cached result and current data set tracker reference are both null.

The following is one example of pseudo-code for operation 140:

```
Tracker {
    function dataIsUnchanged( ){
    return TRUE if <<Tracker.DataSet>.Tracker>
    \\if the reference still points to this reference
    }
}
```

If the tracker object associated with the cached result and the current data set tracker object are the same when compared in operation 140, then the data set may not have been modified since the cached result was calculated. In this circumstance, the cached result may still be based on the current data in the data set. Thus, a code accessing the data set may keep the cached result and the tracker object associated with that result in operation 190 as both the result and the tracker object are still based on the current data set.

If the tracker object associated with the cached result and the current data set tracker object are not the same when compared in operation 140, then the data set has been modified since the cached result was last calculated. In this circumstance, the code may check whether the current data set tracker reference is null in operation 150. If the current data set tracker is null in operation 150, the code may instruct the data set to create a new data set tracker object and assign the new data set tracker to the new cached result in operation 160. If the current data set tracker object reference is not null, then the code may assign the current data set tracker reference to the new cached result in operation 170. Retrieving a reference to the current data set tracker object allows the code to compare the reference to the data set tracker object of the cached result to the current data set tracker object if the code accesses the data set at a later time.

After either creating the new data set tracker in operation 160 or assigning the current data set tracker to the new cached result in operation 170, the code may then calculate and save the calculated result in operation 180. After the new result is calculated and cached, the result may now be used by the code in operation 190.

The following is one example of pseudo-code for operation 150 and operation 160:

```
Tracker {
    Reference DataSet;
    function Tracker.create(Dataset ds) {
    Set <Tracker.DataSet>reference to ds;
    }
}
DataSet {
    function DataSet.getTracker ( ){
    if (DataSet.Tracker is null reference) {
        Set <DataSet.Tracker>=Tracker.create(this DataSet);
    }
    return <DataSet.Tracker>reference
    }
}
```

The following is one example of pseudo-code for operation 170, 180 and 190:

```
Cacher {
    Reference Tracker;
    //<Cacher> is associated with the <DataSet>
    Result cachedresult;
    function getResult( ){
    if (<Cacher.Tracker> reference is null)
        OR
    (<Cacher.Tracker>.dataIsUnchanged is FALSE)
    {
        Set <Cacher.Tracker>=<DataSet>.getTracker( )
        cachedresult=calculateResult( )
    }
    return cachedresult;
    }
    function calculateResult( ){
    //Calculate the result from the data in <DataSet>
    }
}
```

Some method may be beneficial to reclaim the storage used by previous trackers. Since both the data set and an arbitrary number of caching agents need to reference these trackers independently, some mechanism may be used which reclaims the old trackers when there are no outstanding references. This mechanism may be a conventional garbage collector or a reference counting scheme.

To avoid a situation where the implementation of a tracker object might interfere with reclaiming the memory used by a large data set, another embodiment may employ delegate data set objects. One situation where this may arise is during garbage collection. The term "garbage collection" typically refers to a method an application uses to reclaim memory used by objects that will never be accessed or modified again by the application. Tracker objects may need to determine if they are the current tracker associated with the data set. To perform this test, they may need to point back at something in the data set that will allow the tracker to examine the current data set tracker. If tracker objects reference back to the data set itself then they may prevent the data set from being collected when it is no longer in use. This is particularly troubling if there is a large amount of data in the data set. Thus, one alternative implementation associates the tracker objects with a delegate data set object, rather than to the real data set. The delegate may then provide storage for the reference to the current tracker associated with a data set without storing the actual data. Thus, tracker objects referencing the delegate object may only keep in memory the minimal data associated with the delegate object (i.e. a reference to the most recent tracker) rather than the full data set. Therefore, if tracker objects only reference the delegate objects then the rest of the data in the data set may be successfully garbage collected as soon as the outstanding references to the data set itself are gone, regardless of whether some part of the system may still be holding references to trackers that were previously associated with the data set.

The following is one example of pseudo-code for the delegation:

```
Tracker {
    Reference TrackerDelegate my Delegate;
    // No other data references
    function create (TrackerDelegate td) {
        Set <Tracker.myDelegate>reference to td
    }
    function dataIsUnchanged( ) {
    return TRUE if <<Tracker.myDelegate>.currentTracker>
        reference points to this <Tracker> reference
    }
}
TrackerDelegate {
    Reference Tracker currentTracker;
    // No other data references
    function nullTracker( ) {
        <TrackerDelegate.currentTracker> = null reference;
    }
    function getTracker( ) {
        if (<TrackerDelegate.currentTracker> == null) {
            <TrackerDelegate.currentTracker> =
                Tracker.create(this Delegate);
        }
        return <TrackerDelegate.currentTracker>;
    }
}
DataSet {
    Reference TrackerDelegate delegate = new <TrackerDelegate>;
    Reference largedatarepository;
    function modifyData(...) {
        //modify the data in largedatarepository
        <DataSet.delegate>.nullTracker( );
```

```
    }
    function getTracker( ) {
        return <DataSet.delegate>.getTracker( );
    }
}
```

Figure 2:
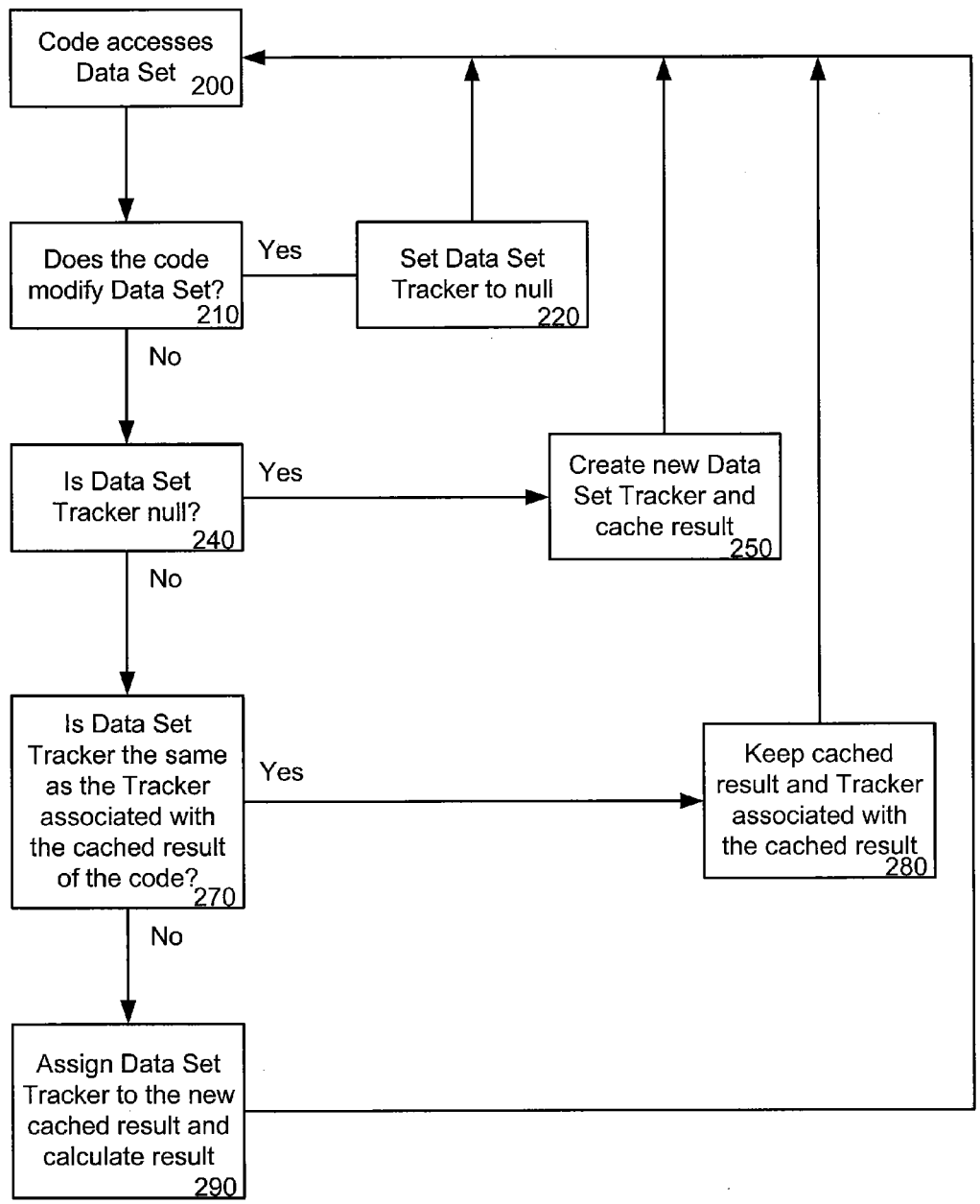
FIG. 2 is a flow chart illustrating an alternate embodiment of the present invention providing a tracker for a data set.

FIG. 2 is a flow chart illustrating an alternate embodiment conforming to aspects of the present invention. Operations 200, 210 and 220 are similar to operations in FIG. 1. In operation 200, a code may access a complex data set. In operation 210, it is determined whether the code modifies the data set or uses the data set to calculate a result. If the code modifies the data set, the program may set the reference to a data set tracker object to null in operation 220.

In this embodiment, if it is determined in operation 210 that the code accesses the data set to conduct a calculation rather than to modify the data set, then the code may check the current data set tracker object in operation 240. If the current data set tracker object reference is null, then the code may create a new tracker object and assign it with the data set. The code may then calculate the result using the data from the data set and cache the result along with the reference to the newly created data set tracker object in operation 250. Retrieving a reference to the current data set tracker object allows the code to compare the reference to the data set tracker object of the cached result to the current data set tracker object if the code accesses the data set at a later time.

If the reference to the data set tracker object is not null when the code accesses the data set to perform a calculation in operation 240, then the code may compare the data set tracker object associated with an earlier cached result to the current data set tracker object in operation 270. If the tracker object associated with the cached result and the current data set tracker object are the same when compared in operation 270, then the data set may not have been modified since the cached result was calculated. In this circumstance, the cached result may still be based on the current data set. Thus, a code accessing the data set may keep the cached result and the tracker object associated with that result in operation 280 as both the result and the tracker object are still based on the current data set. If the tracker object associated with the cached result and the current data set tracker object are not the same when compared in operation 270, then the data set has been modified since the cached result was last calculated. In this circumstance, the code may calculate the new result based on the current data set and cache the result and a reference to the current data set tracker in operation 290.

In conjunction with or separate from use of a tracker, various implementations set forth herein may assign a state value to the data set to assist a code that may be accessing the data set. The state values may define certain characteristics of the data set, allowing the code to bypass some of the above operations when ascertaining if the data set is unchanged. For example, the data set may be associated with an untrackable state, such as when the data set is modified outside of the current program. Some data sets may enter a state where they are associated with an external code base or hardware data streams that may modify the data in the data set. The external code or data streams may not have the capability to notify the program when the data sets have been changed. Therefore, the data set may be assigned an untrackable state value to indicate to a code accessing the data that the data has always been modified since the last cached result. Thus, code accessing an untrackable data set may by default recalculate the result without first determining whether the data set has been modified. Because it may be indeterminate whether the data has changed without actually comparing data sets or otherwise, assigning an untrackable state value to the data set ensures that the calculated result is based on the most current form of the data set.

The data set may also be associated with a dynamic state. The dynamic state may be associated with the data set when the data set receives frequent and reliable updates which may be tracked, but in practice the updates are so frequent that tracking the updates would require large amounts of memory and processor time. Thus, in one particular implementation, the data set may be assigned with a dynamic state value to indicate to a code accessing the data that the result should be recalculated as the data set is being modified too rapidly to efficiently track. Therefore, any code accessing a data set with a dynamic state attribute may forego the comparison of the trackers and may ensure that the result is recalculated rather than rely on a possibly inaccurate cached result. Further, the dynamic state may be a temporary state that could be updated to another state at some point in the future. For example, the data set may enter the dynamic state while the data set is being modified and return to a stable state once the modification is complete. Code seeking to access the data of the data set in the dynamic state may monitor the state of the data set until the state returns to a stable state.

It is also possible to assign a stable state value with a data set. A stable state value may indicate to a code accessing the data set that the data set is stable and the changes to the data set may be tracked accurately. Therefore, the code accessing any data set assigned a stable state value may compare the tracker of the cached result to the current tracker of the data set as described above to more efficiently come to an accurate calculated result.

The data set may also be associated with an immutable state. An immutable state value is assigned to a data set when modification of the data set is not allowed. Thus, a code accessing a data set assigned an immutable state value can simply use any previously cached result because the data set will continually remain unchanged. Therefore, the code does not need to perform the operations of comparing the tracker assigned to a cache result against the current data set tracker. Instead, a code may simply retain and use the cached result of a previous calculation utilizing the data set.

Altering the pseudo-code provided above to implement the different states of the data set may include:

```
AlwaysCurrentTracker subclasses Tracker {
    function dataIsUnchanged {
    return TRUE;
    }
}
NeverCurrentTracker subclasses Tracker {
    function dataIsUnchanged ( ){
    return FALSE;
    }
}
State enum {
    UNTRACKABLE // no way to track if it is changing
    DYNAMIC // changing too frequently to track for now
    STABLE // changing infrequently—can be tracked
    IMMUTABLE // will never change again
}
DataSet {
    State state;
    function getState ( ) {
    return state;
    }
    function setState (State newstate) {
```

```
// Verify that state is not changing from
// IMMUTABLE or UNTRACKABLE to some other state
set state=newstate;
Set<DataSet.Tracker>reference to the null reference;
}
function getTracker ( );
switch (state) {
case IMMUTABLE: return <AlwaysCurrentTracker>;
case DYNAMIC: return <NeverCurrentTracker>;
case UNTRACKABLE: return <NeverCurrentTracker>;
case STABLE:
    if (DataSet.Tracker is null reference) {
        Set <DataSet.Tracker>=Tracker.create(this DataSet);
    }
    return <DataSet.Tracker>reference;
    }
}
}
```

As explained above, to avoid a situation where the current data set tracker reference and the tracker associated with the cached result are both null when compared in operation 140, the initial state of the reference tracker associated with the cached result may be initialized to point to a special tracker instance which may indicate that the data has been changed, rather than being set to null. The following is one example of pseudo-code for the cacher that does not set the tracker reference to null:

```
Cacher {
    Reference Tracker=<NeverCurrentTracker>;
    function getResult ( ) {
    //Note: no need to check if <Tracker> is null
    if (<Tracker>.is DataUnchanged ( )==FALSE) {
        //recalculate result
        Set <Tracker> reference to <DataSet>.getTracker ( )
    }
    }
}
```

Figure 3:
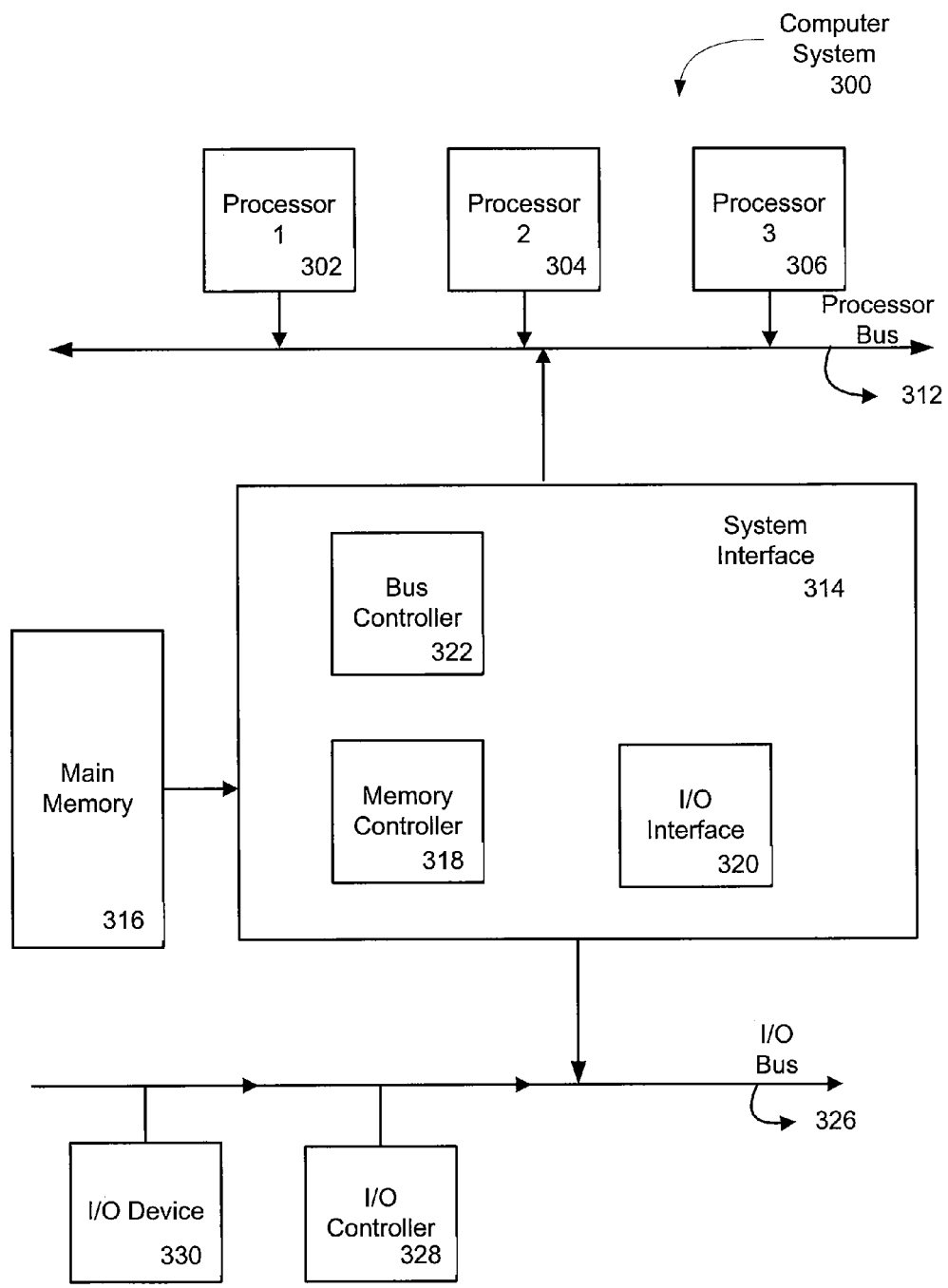
FIG. 3 is block diagram illustrating an exemplary computer system.

FIG. 3 is a block diagram illustrating an exemplary computer system 300 which may be used in implementing embodiments of the present invention. The computer system (system) includes one or more processors 302-306. Processors 302-306 may include one or more internal levels of cache (not shown) and a bus controller or bus interface unit to direct interaction with the processor bus 312. Processor bus 312, also known as the host bus or the front side bus, may be used to couple the processors 302-306 with the system interface 314. System interface 314 may be connected to the processor bus 312 to interface other components of the system 300 with the processor bus 312. For example, system interface 314 may include a memory controller 318 for interfacing a main memory 316 with the processor bus 312. The main memory 316 typically includes one or more memory cards and a control circuit (not shown). System interface 314 may also include an input/output (I/O) interface 320 to interface one or more I/O bridges or I/O devices with the processor bus 312. One or more I/O controllers and/or I/O devices may be connected with the I/O bus 326, such as I/O controller 328 and I/O device 330, as illustrated.

I/O device 330 may include a display device (not shown), such as a cathode ray tube (CRT) or liquid crystal display (LCD), for displaying information to an end user. I/O device 330 may also include an input device (not shown), such as an alphanumeric input device, including alphanumeric and other keys for communicating information and/or command selections to the processors 302-306. Another type of user input device includes cursor control, such as a mouse, a trackball, or cursor direction keys for communicating direction information and command selections to the processors 302-306 and for controlling cursor movement on the display device.

System 300 may include a dynamic storage device, referred to as main memory 316, or a random access memory (RAM) or other devices coupled to the processor bus 312 for storing information and instructions to be executed by the processors 302-306. Main memory 316 also may be used for storing temporary variables or other intermediate information during execution of instructions by the processors 302-306. System 300 may include a read only memory (ROM) and/or other static storage device coupled to the processor bus 312 for storing static information and instructions for the processors 302-306. The system set forth in FIG. 3 is but one possible example of a computer system that may employ or be configured in accordance with aspects of the invention. Many other possible computer systems may also employ aspects of the invention, and the invention should not be limited to this particular system.

It should be noted that the flowchart of FIG. 1 and FIG. 2 are illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for tracking the stability of a data set for multiple observers comprising:
   accessing a data set for use by a code, the code to modify the data set and to use data in the data set to obtain a result for a calculation;
   determining whether the data set is modified by the code;
   in the event the data set is modified by the code:
      setting a current data set tracker to a value, the value indicating only that the data set has been modified; and
   in the event the data set is not modified by the code:
      comparing a stored data set tracker value with the current data set tracker value;
      determining the stored data set tracker value is the same as the current data set tracker value; and
      using a cached result previously calculated by the code as the result for the calculation instead of recalculating the result.

2. The method of claim 1 further comprising:
   in the event the current data set tracker equals the value:
      creating a new data set tracker;
      calculating the result from the data set; and
      storing the result and the new data set tracker.

3. The method of claim 1 further comprising:
   in the event the current data set tracker does not equal the value:
      assigning the current data set tracker to a cached result;
      calculating the result from the data set; and
      storing the result and the current data set tracker.

4. The method of claim 1 further comprising:
associating the current data set tracker to a delegate object.

5. The method of claim 1 further comprising:
assigning a state value to the data set.

6. The method of claim 5 wherein the state value indicates that the data set cannot be modified.

7. The method of claim 5 wherein the state value indicates that modifications to the data set are temporarily too frequent to be tracked.

8. The method of claim 5 wherein the state value indicates that the modifications to the data set cannot be tracked.

9. The method of claim 5 wherein the state value indicates that the data set is stable.

10. The method of claim 5 wherein the state value is one of:
immutable if the data set cannot be modified;
dynamic if modifications to the data set are too frequent to be tracked;
untrackable if the data set cannot be tracked; and
stable if the data set is stable.

11. The method of claim 2 wherein the value equals null.

12. A method for accessing a data set comprising:
comparing a stored data set tracker value with a current data set tracker value;
determining the stored data set tracker value is the same as the current data set tracker value;
using a cached result previously calculated by a code as a result for a calculation based on the data set instead of recalculating the result;
in the event the stored data set tracker value and the current data set tracker value are not the same:
determining if the current data set tracker is set to a particular value, the particular value indicating only that the data set has been modified;
in the event the current data set tracker is set to the particular value:
creating a new data set tracker;
calculating the result based on the data set; and
caching the result and the new data set tracker; and
in the event the current data set tracker is not set to the particular value:
assigning the current data set tracker to the cached result;
calculating the result based on the data set; and
caching the result and the current data set tracker.

13. The method of claim 12 further comprising:
assigning a state value to the data set.

14. The method of claim 13 wherein the state value indicates that the data set cannot be modified.

15. The method of claim 13 wherein the state value indicates that modifications to the data set are temporarily too frequent to be tracked.

16. The method of claim 13 wherein the state value indicates that the modifications to the data set cannot be tracked.

17. The method of claim 13 wherein the state value indicates that the data set is stable.

18. A system comprising:
a system interface; and
a processor coupled to the system interface through a processor bus, the processor to:
determine whether a current data set tracker is set to a value, the value indicating only that the data set has been modified;
in the event the data set tracker is set to the value:
create a new data set tracker;
calculate a result based on the data set; and
store the result and the new data set tracker;
in the event the data set tracker is not set to the value:
compare a cached data set tracker value to the current data set tracker value; and
determine the stored data set tracker value is the same as the current data set tracker value;
use a cached result previously calculated by a code as the result for a calculation based on the data set instead of recalculating the result; and
in the event the cached data set tracker value and the current data set tracker value are different:
calculate the result based on the data set and cache the result and the current data set tracker.

19. The system of claim 18 wherein the processor assigns a state value to the data set.

20. The system of claim 19 wherein the state value indicates whether the data set cannot be modified, the modifications to the data set are too frequent to be tracked, the data set is modified by an outside program, or the data set is stable.

* * * * *